US006418223B1

(12) United States Patent
Wootton et al.

(10) Patent No.: US 6,418,223 B1
(45) Date of Patent: Jul. 9, 2002

(54) AUTHENTICATION ALGORITHMS FOR VIDEO IMAGES

(75) Inventors: John R. Wootton; Gary S. Waldman, both of St. Louis; Gregory L. Hobson, St. Charles, all of MO (US)

(73) Assignee: Esco Electronics Corporation, St. Louis, MO (US)

( * ) Notice: Subject to any disclaimer, the term of this patent is extended or adjusted under 35 U.S.C. 154(b) by 0 days.

(21) Appl. No.: 09/244,911

(22) Filed: Feb. 4, 1999

Related U.S. Application Data

(63) Continuation-in-part of application No. 08/757,838, filed on Nov. 27, 1996, now Pat. No. 5,870,471.

(51) Int. Cl.⁷ .............................. H04L 9/36; H04N 1/407
(52) U.S. Cl. ................. 380/246; 380/216; 380/243; 358/535; 713/176; 713/179; 713/181
(58) Field of Search ................................ 380/216, 243, 380/246; 713/177, 178, 179, 181; 358/526, 527, 534, 535

(56) References Cited

U.S. PATENT DOCUMENTS 5,801,856 A  * 9/1998 Moghadam et al. ........ 358/527
5,862,218 A  * 1/1999 Steinberg .................... 380/10
6,269,446 B1 * 7/2001 Schumacher et al. ....... 713/176

* cited by examiner

Primary Examiner—Justin T. Darrow
(74) Attorney, Agent, or Firm—Polster, Lieder, Woodruff & Lucchesi, L.C.

(57) ABSTRACT

A method of authenticating a video image created by a camera (V) or similar video device. The image is formed into a first 2-dimensional pixel array (A1) with each pixel ($p_{m,n}$) represented by a data word of a predetermined length. Additional data words including event information are added to this 2-dimensional array (A1). The formatted array is converted into a second 2-dimensional array (A2) which may be made smaller than the first array by eliminating rows and columns from the formatted array. A first linear vector (A3) is created using the data words in the second array, and a second linear vector (A4) is created by repositioning the data words from the first linear vector in a random pattern. A checksum is created by summing the contents of all of the data words in the second linear vector beginning at a location established by a pre-established formula. A header (H) is formed using the resulting checksum, information identifying the device used to create the image, and the time the image is formed. A cyclical redundancy check (CRC) is performed using all the data words in the formatted array (A1). Results of this operation are also included in the header. The header is attached to the formatted image and is transmitted and stored with the formatted image to subsequently authenticate the contents of the original image.

19 Claims, 3 Drawing Sheets

AUTHENTICATION ALGORITHMS FOR VIDEO IMAGES

CROSS-REFERENCE TO RELATED APPLICATIONS

This application is a continuation-in-part of U.S. patent application Ser. No. 08/757,838 filed Nov. 27, 1996 entitled AUTHENTICATION ALGORITHMS FOR VIDEO IMAGES, now U.S. Pat. No. 5,870,471 A.

STATEMENT REGARDING FEDERALLY SPONSORED RESEARCH OR DEVELOPMENT

Not applicable.

BACKGROUND OF THE INVENTION

This invention relates to the authentication of visual images such as are produced by a video camera or the like, and more particularly to a method of authentication employing algorithms to encode information by which the image can be authenticated.

There are a variety of situations in which it is important to know that a visual image such as an image transmitted from one location to another, or a stored image which is to be used at a later time is provided or maintained in the exact form in which it was produced. In the medical field, for example, it is now commonplace to transmit a picture (a visual image) of a patient from one site (a local hospital, for example) to another (the location of a specialist). The image may be an x-ray, CAT scan image, or other image of the patient. Because the image may be used in making a diagnosis, describing a medication or course of treatment, or viewed by a specialist while surgery is being performed, any inaccuracies in the received image can potentially have serious consequences. And, it is known that transmission errors due to noise on the transmission line, temporary disruptions, etc. do occur.

As a further example, many police interrogation rooms are equipped with video equipment so the police examination of a suspect can be recorded. The resulting record can then be used for evidentiary purposes, as well as to defend the police against charges by a suspect that he was mistreated or that a confession was forced from him.

In security systems, to use another example, a video system may capture the image of an intruder during an unauthorized entry. The image therefore can become part of the evidence which is used to prosecute a suspect. To use the image as evidence against the suspect at trial, it is necessary to maintain the image in its original form and do so in a way that the custodian of the evidence can clearly demonstrate to a court that the image has not been tampered with. It is well known that technology exists by which images can be modified. Such technology can be used to alter the image in such a way that its evidentiary value is destroyed. It is thus important to provide a foolproof method by which tampering can be prevented, or if tampering occurs, it is readily discernible.

In the above referenced patent application, a method was described in which a 2-dimensional pixel matrix representing an image to be authenticated was created from an image frame. From this matrix, a second 2-dimensional matrix was created in accordance with certain rules. A first linear vector was then formed from the second 2-dimensional matrix, and a second linear vector was created by reforming blocks of information from the first linear vector. A checksum value was then determined. This value was then attached to a header of the image frame and retained with the frame for subsequent authentication of the contents of the image and to serve as an indication if the image contents had been tampered with. This application addresses improvements in this authentication methodology.

In particular, formation of the second 2-dimensional array in the co-pending application was done by eliminating certain rows and columns from the first 2-dimensional array in accordance with a set of rules. From an evidentiary standpoint, a defendant whose image is captured in an authenticated video image might try to argue that because the pixels in the eliminated rows and columns were "not touched" by the authentication process, the image does not have evidentiary value. While this is untrue, it may be easy to see why attempting to explain this methodology to a judge and jury could confuse them. Accordingly, the method has been modified so that as part of the authentication process, every pixel comprising the image being authenticated is now "touched," and the results of that "touching" is included with the other authentication information. In addition, other event relation is now included with the first 2-dimensional array prior to performing the other steps in the authentication process.

BRIEF SUMMARY OF THE INVENTION

Among the several objects of the present invention may be noted the provision of a method of authenticating visual images so to prevent tampering with the image, or if the image is transmitted from one location to another, to make it easy to determine if the image which was received exactly corresponds with that which was transmitted;

the provision of such an authentication method in which data representing the content of the whole or a portion of the image is encrypted at the time the image is produced with this encrypted portion of the image being maintained with the entire image for subsequent authentication of the image;

the provision of such a method in which the encryption of the portion of the image is accomplished using an algorithm that has as a factor elements of the time at which the image is produced, these elements including the month, day, hour, and minute at which the image is produced;

the provision of such a method in which the image content encryption code changes minute by minute, so the results from the encryption of an image at one minute produces an authentication code which is different from the authentication code which would result if the encryption were made a minute earlier or a minute later;

the provision of such a method by which, once the image is authenticated, if the image subsequently tampered with, or otherwise altered, such tampering or alteration is not only immediately discernible, but the portion of the image which has been tampered with or altered can be readily identified;

the provision of such a method by which the visual image is converted to a data format arranged in a first array and subsequently processed through successive arrays or linear vectors as part of the encryption process;

the provision of such a method to employ a cyclical redundancy check by which every pixel comprising the image is processed, the results of this processing being retained with the other authentication information;

the provision of such a method in which a total image checksum value is ultimately derived for the processed image, the checksum value then being placed in a header attached to the original image, the image and header then being stored or transmitted together so the checksum information can be used to provide image authentication;

the provision of such a method in which bits identifying the camera with which the image is taken, time and place of the event, and other related information are also processed together with the image pixels whereby the total image checksum includes camera identification and other event related information;

the provision of such a method to further include in the header information as to where the image was taken and the time at which the image was formed;

the provision of such a method in which encryption codes used in the algorithm used can be varied from one location to another, and in which the codes are periodically changed;

the provision of such a method which is useful, for example, in transmitting pictorial medical information from one location to another to verify that an image which is received corresponds with that transmitted, or in a security system for monitoring a facility and detecting a breach in security at the facility, especially where evidence of the breach is captured by a camera and it is important to subsequently authenticate the image produced for use by law enforcement officials, or in court; and, the provision of such a method in which the algorithm used for producing the authentication is readily incorporated in image processing equipment located at the site where images are produced so authentication for the image can be created when the image is produced.

In accordance with the invention, generally stated, a method is taught for authenticating a video image created by a camera or other video device. The visual image is transformed into a data format with a 2-dimensional array being created in which each pixel forming the image is represented by a data word of predetermined length. This array may be converted into a second 2-dimensional array of a size different than that of the first array to reduce the required data transmission rate. This is not an essential part of the algorithm but may simply be a practical necessity. It will be understood that the algorithm works for all pixel formats (512×480, 384×288, etc.). This conversion is performed using a set of rules by which certain rows and columns in the formatted array are eliminated. A first linear vector is now formed and includes the data words transferred from the first to the second 2-dimensional array. A second linear vector is formed by rearranging the data words in the first linear vector, the new locations of the data words in the second linear vector being randomly selected. Camera identification, time, place and other relevant information are also included in the vector. A total image checksum is determined using the data words as arranged in the second linear vector. A cyclical redundancy check is also performed, this check involving all the pixels forming the image. A header is created using the resulting checksum and cyclical redundancy check results, and other relevant information. This header is attached to the formatted array. Other objects and features will be in part apparent and in part pointed out hereinafter.

BRIEF DESCRIPTION OF THE SEVERAL VIEWS OF THE DRAWINGS

In the drawings.

Corresponding reference characters indicate corresponding parts throughout the drawings.

DETAILED DESCRIPTION OF THE INVENTION

Figure 1:
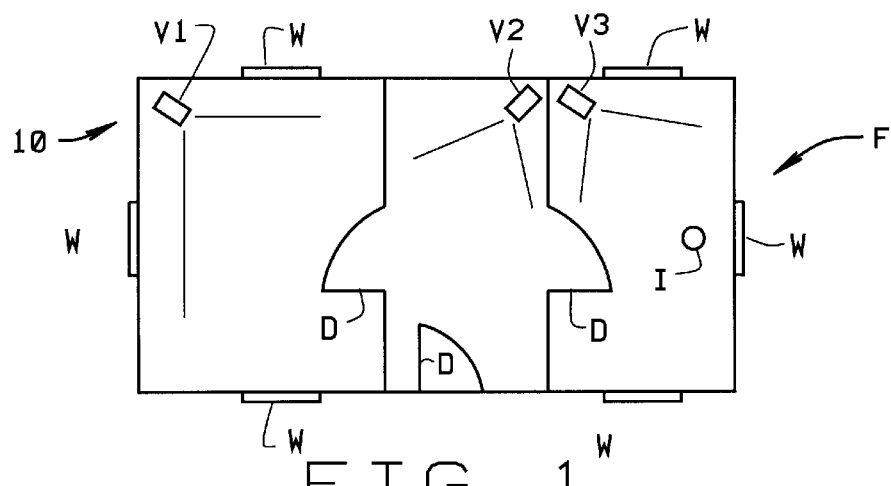
FIG. 1 represents a facility where a security system utilizing the image encoding and authentication method of the present invention is installed as an example of the usefulness of the method.
Figure 2:
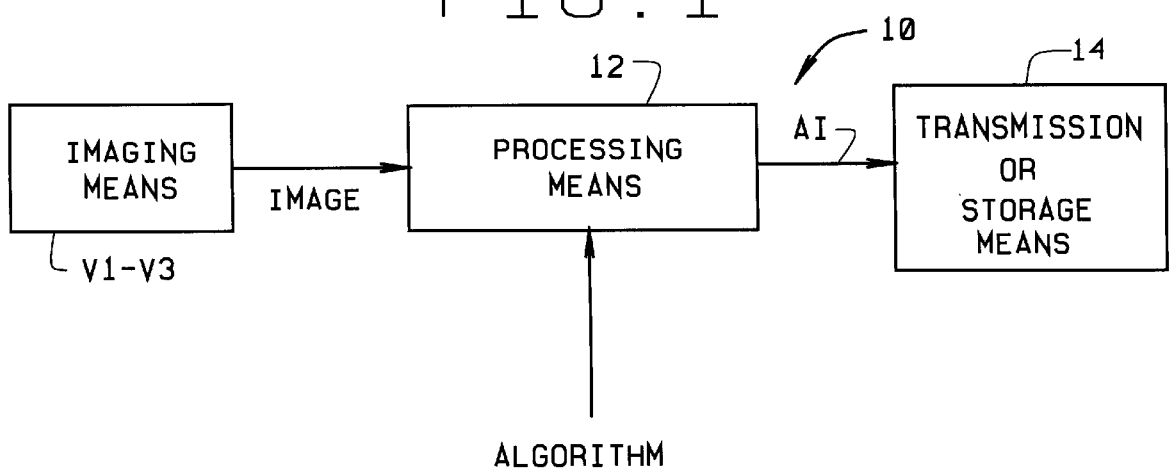
FIG. 2 is a simplified block diagram of an image processing system in which the authentication process is employed.

Referring to the drawings, the method of the present invention is used to authenticate a visual image which may be produced in any of a number of different circumstances. For example, a facility F employs a security system 10 to detect the presence of an intruder I who may enter the facility through a door D or window W. The security system employs an imaging means which is represented in FIG. 1 by video cameras V1–V3. The cameras are strategically located throughout the facility to capture an image of an intruder when facility security is breached. In FIG. 2, security system 10 is shown to include a processing means 12 for processing any image captured by a camera V. If it is determined an image from a camera includes that of an intruder, it becomes important to process the image so the intruder's identity can be determined. It is also important that the image be authenticated so if it is stored for later use, or transmitted to the authorities, it can be immediately determined that the image is authentic, or if not, where an alteration to the image has occurred. This is important for evidentiary purposes. Those skilled in the art will recognize other situations in which image authentication is useful. For example, as previously mentioned, it is now common to transmit visual images of a patient from one place to another for diagnostic purposes, for example. Using the method of the present invention, any transmission errors caused for whatever reason, can be immediately ascertained. This prevents the integrity of a transmitted image from being compromised. The method of the present invention provides a unique process by which image authentication is achieved. Further, the encryption techniques employed in carrying out the process result in the authentication of an image which will be different at one time from another.

Figure 3:
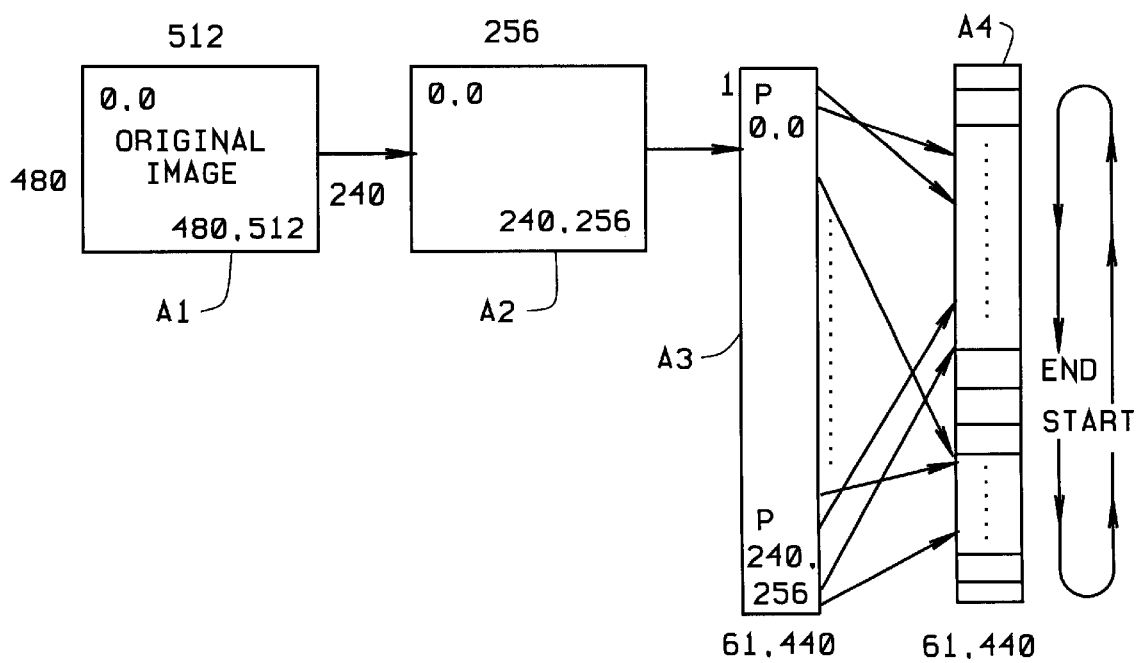
FIG. 3 is a representation of the steps performed in accordance with the method to produce an image authentication.

Referring to FIG. 3, the original image captured by a camera V comprises a plurality of individual pixels. Each pixel can be converted into a data word, for example, a 6-bit data word. The data words can then arranged into a 2-dimensional formatted array having m rows r and n columns c. A 2-dimensional array of 480 rows and 512 columns is designated A1 in FIG. 3. Designations for the pixel locations start at the upper left corner of the array, and proceed across and down the array to the lower right. The value of a pixel in the array at a position m,n is given by $P_{m,n}$ with the upper left pixel in the array being designated $p_{0,0}$, and the pixel in the lower right $P_{479,511}$.

In addition to the data bits representing the image pixels, 2-dimensional array A1 further includes additional data words. These additional data words involve event related information and include information bits identifying the camera V capturing the image, a surveillance unit which controls the camera, the time and date of the event captured, and the sequence number of the event. These additional data words are appended to the array after the data word for the last pixel in the array. This serves to increase the number of rows in the array, although the number of columns typically remains the same.

Figure 4:
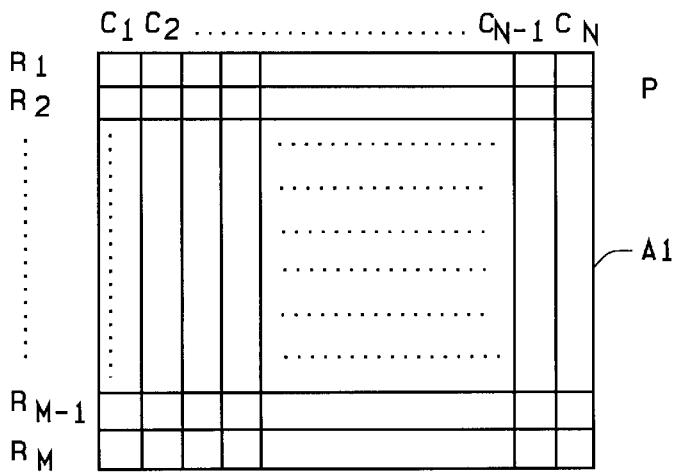
FIG. 4 illustrates a 2-dimensional arrangement of data words representing pixels forming the visual image.

In accordance with the invention, array A1 representing the original image and the vent related information is first converted into a second and, if necessary for data reduction, smaller array A2. In FIG. 4, array A1 is shown to include a plurality of rows $r_1, r_2, \ldots r_{m-1}, r_m$, and a plurality of columns $c_1, c_2, \ldots c_{n-1}, c_n$. In converting from array A1 to array A2, the process involved may require the elimination of rows and columns from array A1 in accordance with a set of rules. One such set of rules may be:

a) eliminate the even numbered rows if the hour at which the image is formed is an even numbered hour;
b) eliminate the odd numbered rows if the hour at which the image is formed is an odd numbered hour;
c) eliminate the even numbered columns if the day of the month at which the image is formed is an even numbered day; and,
b) eliminate the odd numbered columns if the day of the month at which the image is formed is an odd numbered day.

In accordance with these rules, the resulting array A2 will be a 240×256 2-dimensional array in which the constituent data words included in the array will change from one hour to the next. Further, it will be appreciated that the rules can use other elements for the measure of time (hours and minutes), and also that the rules can require other manipulations beside the elimination of every other row or column. This means that array A2 could be a larger or smaller array than the 240×256 array shown in FIG. 3.

Figure 5:
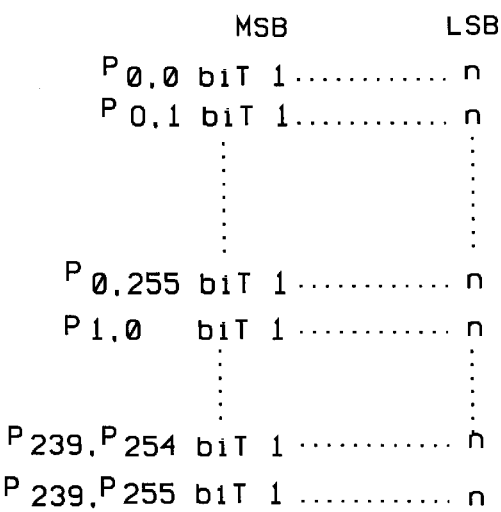
FIG. 5 illustrates a linear vector formed by converting a 2-dimensional array.

Once array A1 is converted into array A2, the next step is to convert array A2 into a linear vector A3. This is done by concatenating the data words in the array so they are now arranged linearly as shown in FIG. 5. The first element in linear vector A3 comprises the 6-bit data word for the first pixel $p_{0,0}$ in array A2. The next pixel is $p_{0,1}$, then $p_{0,2}$, and so forth through to pixel $p_{239,255}$. The resulting vector has a vector length of 61,440 data words (240*256).

Linear vector A3 is next transformed into a second linear vector A4. As indicated by the arrows in FIG. 3, the locations of the data words are shuffled so the locations they occupy in array A4 is unique and is determined in accordance with a look-up code provided to processing means 12. According to the code, vector locations in vector A3 are randomly redistributed in vector A4. The position shuffling code is changed on a periodic basis which can be monthly, daily, hourly, or by the minute. As a result, the location of the same words transferred from vector A3 into vector A4 will be different from one time to another.

After forming vector A4, the method next includes the calculation or determination of a checksum for the data words as they are now arranged in this vector. In performing the checksum, a location on the linear vector is selected as a starting location. The location selection is done using a formula which incorporates elements of the time at which the image is formed, and an identification number of the video camera V used to form the image. Again, these can include the month, day, hour, and minute at which the image is produced, or a combination of the elements. Each of these four time elements may, for example, have a value ascribed to it. The elements are then combined in a predetermined manner. That is, one element may be added to, subtracted from, multiplied with, or divided by another element. Constants can also be used with the elements. Those skilled in the art will appreciate that a wide range of combinations are possible without departing from the scope of the invention. If minutes, for example, are used in the formula, then a starting location determined in accordance with the formula will change minute by minute. Accordingly, the starting location selected in array A4 at one minute will be different from that which is selected the next minute.

Figure 6:
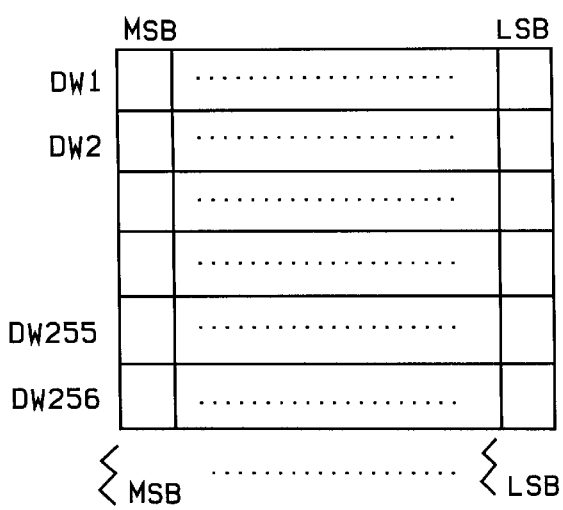
FIG. 6 illustrates a portion of the process by which a checksum is produced for image authentication.

Referring to FIG. 3, the location in array A4 where a checksum determination starts is indicated. As indicated by the Fig., a predetermined block B1 of words, 255 for example, is selected and their corresponding bit values sequentially summed. After the first summation is complete, a second predetermined block B2 is taken and the process repeated. As shown in FIG. 6, the checksum determination includes taking 255 consecutive data words DW1–DW255 from array A4. The most significant bits of each data word are summed together to produce a value Σmsb. The process is repeated for each column of bits until the sum of the least significant bits Σlsb is calculated. Each summation is used to form 6 new data bytes for the respective summation values. Because array A4 includes 241 blocks B1–B241 each having 255 data words (except the last block which has only 240 data words), at the end of the checksum process, a sequence of 1,446 bytes (241*6) will have been produced. These bytes now represent an encrypted value of the contents of the original image.

Alternatively, a second checksum can be derived by taking the first value previously chosen and adding the bits from the next 255 entries further along (i.e., the first entry in the next block in array A4) and continuing the summation for all 241 blocks of data words. Then starting at the next entry of the original block, another checksum is found. This process is continued until all entries in the block are exhausted, and will result in an additional 255×6 checksum.

In addition to the above described process, the method of the present invention further includes performing a cyclical redundancy check (CRC) on the data bits comprising array A1. The CRC involves exercising an algorithm by which bits comprising the pixels and event related information are summed together with the results stored in an n-bit register. For example, the bits at array address 0,0 are summed with the bits at address 0,1. This result is now summed with the bits at array address 0,2 and so forth until bits at all the array addresses have been summed. For purposes of performing the CRC, it is immaterial that the summation results overflow the register. It is also not important where in the array the CRC process begins, only that all of the bits forming the respective data words are summed. The CRC is important, however, because the final contents of the register represent a result derived from bits at all the addresses in the array.

Thus, every pixel representing the image is "touched" and the final contents of the register reflect this touching.

Figure 8:
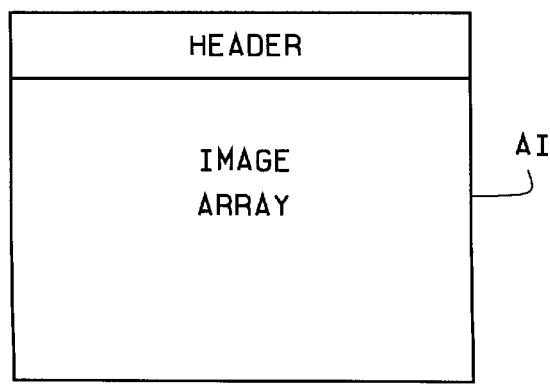
FIG. 8 is a simplified representation of the resulting authenticated image; and, FIG. 9 illustrates the steps performed in carrying out a second form of the method of the invention.
Figure 7:
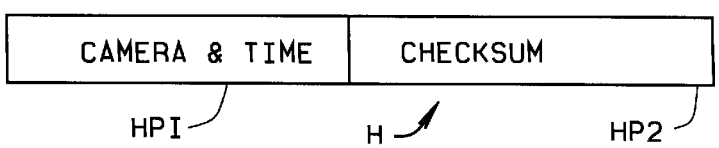
FIG. 7 is a simplified representation of a header which is created using the checksum and information relating to the time and place the image was produced.

Next, a header H is formed using the checksum values and information relating to the camera which produced the image and the time (month, day, hour, and minute) at which the image was formed. As shown in FIG. 7, header H has three parts. The first part HP1 includes the camera and time reference information. The second part HP2 includes the 1441 checksum bytes. The third part HP3 includes the contents of the register in which the CRC value is accumulated. It will be understood that the information relating to the camera identification and time reference will comprise a plurality of bytes and the location of these bytes may be scrambled within header part HP1. It will further be understood that the values for the respective time elements may again be mathematically combined so a month value, for example, may be added, subtracted, multiplied, or divided by a constant value. After the header is formed, it is attached to the initial image array to form a completed authenticated image AI (see FIG. 8). As shown in FIG. 2, this authenticated image is what is supplied by processing means 12 to transmission or storage means 14.

Since header H includes time information about when the image was produced, this information, together with the checksum value can be used to authenticate the image at a later time or different place. If the authentication reveals that the image content is not that of the original image, the location where a change has occurred is determined from by reference to the checksum. Since the formatted image array is a 2-dimensional array, any change in the content will effect values for both the row and column where the change occurs. The checksum value is derived from the information content in the original array, and so incorporates both row and column values. Reference to the checksum will therefore locate where within the array a content value has changed. It will be appreciated that because of all the possible authentication combinations which can result from use of the process, that it is virtually impossible for someone to be able to intentionally change the content value of the image in a way that will not be detected. Further, any alteration to any portion of the image content will also be reflected in the CRC result.

Figure 9:
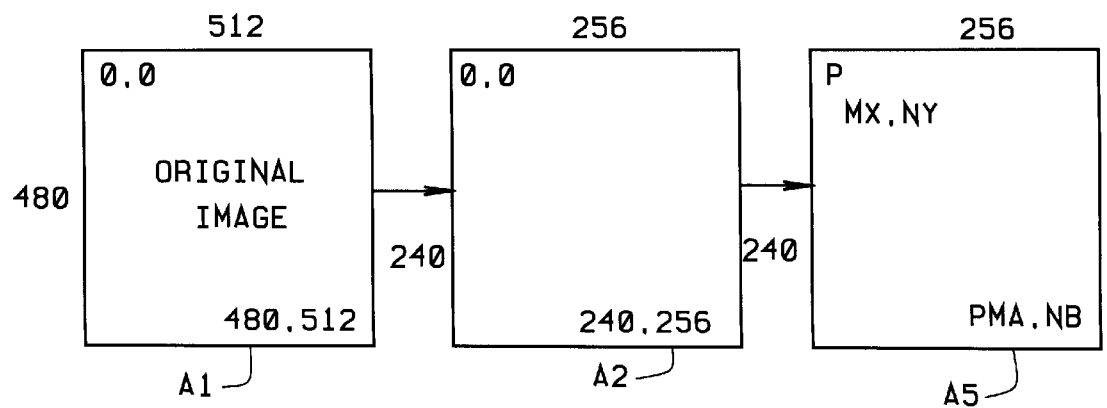

Referring to FIG. 9, a second manner for carrying out the method of the invention includes converting the original image array A1 to a second array A2, as before, with the rows and columns which are eliminated being determined in accordance with an established set of rules. Now, instead of converting 2-dimensional array A2 into a linear vector, a third 2-dimensional array A5 is created in which the rows and columns are shuffled in a random sequence. The code by which this shuffling occurs is again periodically changed so that the repositioning which results at one time differs from that which occurs at another. Thus, in array A5, the first pixel no longer is the pixel $p_{0,0}$; but rather a pixel $p_{mx,ny}$, and the last pixel no longer pixel $P_{239,255}$, but a pixel $p_{ma,nb}$. A checksum is again created, this time by calculating checksums for the rearranged rows and columns in array A5. The location within the array where the checksum determination starts is again based upon a formula which include values representing elements of the time the image is produced. The result is that the location in the array where the checksum starts will be different for one time at which an image formed to another. Once the checksum has been completed, a header H similar to that shown in FIG. 7 is formed. The first portion HP1 of the header again includes location and time information about the image and the second portion HP2 the checksum vector. A CRC is again performed on the image contents of array A1 including the event related information. The CRC results again form a header portion HP3. The header is attached to the original image array A1 to produce the authenticated image This second way of carrying out the method of the invention also has the advantage of authenticating the image at a later time and also of allowing immediate determination of whether and where a change in content of the original image has occurred. Further, this approach has the advantage of requiring only 496 words (241+255) to be processed rather than the 61,440 words required in executing the method as previously described.

Finally, it will be understood that the authentication methodology as described herein, in addition to those uses previously mentioned, also has other application. For example, the methodology can be used with high resolution television (HDTV), in systens having RS 170 capability, as well as systems using CIF and variants thereof.

What has been described is a method of authenticating visual images to verify that the content of an image viewed at a later time is the same as that when the image was produced. Or, if the image content has changed, this is readily detected as well as the location within the image where a change has occurred. The image is encrypted at its source and the authentication remains with the image regardless of its subsequent use. For this purpose, the algorithm used to produce the authenticated image is incorporated in image processing equipment located at the site where the image is produced and authentication occurs at the time the image is produced. Authentication is accomplished by an algorithm which may include as one factor elements of the time at which the image is formed. These elements includes the month, day, hour, and minute at which the image is created. Because encryption can change on a basis of time, an authentication code for an image at one time will be different from an authentication code for the same image made at a different time. Also, because of the range of combinations which can possibly be used to authenticate an image it is virtually impossible for a change in image content to go undetected. The method is useful in a wide range of applications where it is image content be must be verified at a different time or place from those where the image is created.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

Having thus described the invention, what is claimed and desired to be secured by Letters Patent is:

1. In a method of authenticating a video image by forming the image into a data format, encrypting a portion of the formatted image, and attaching the encrypted portion to the original image so the content of the original image can thereafter be authenticated by reference to the encrypted portion thereof, said formatted image comprising a 2-dimensional array of pixels each of which is represented by a data word of a defined length and the method including converting the formatted image from said 2-dimensional array into a second 2-dimensional array, the improvement comprising performing a cyclical redundancy check on the first said 2-dimensional array including the data words for every pixel forming the content of said original image.

2. The improvement of claim 1 further including forming a header for the formatted image using the encrypted portion thereof, and attaching the header to the formatted image, said header including results of said cyclical redundancy check.

3. The improvement of claim 2 further including adding additional data words to the first said 2-dimensional array comprising said formatted image, the contents of said additional data words including information relating to an event captured by said video image.

4. The improvement of claim 3 wherein said additional data words have the same defined length as those data words representing said pixels, and said additional data words are added to the first said 2-dimensional array after the data word representing the last pixel comprising the video image.

5. The improvement of claim 4 wherein said additional data words are formed into rows and columns and forming said second 2-dimensional array includes manipulating rows and columns of the formatted array by a defined set of rules, the rows and columns being manipulated including those having said additional data words.

6. The improvement of claim 5 further including converting the second 2-dimensional array into a linear vector by concatenating the data words contained in the second array.

7. The improvement of claim 6 further including converting said linear vector into a second linear vector in which the position of the data words in the first said linear vector are repositioned in the second linear vector, the positions of the data words in the second linear vector being randomly selected.

8. The improvement of claim 7 further including determining a checksum using the data words as arranged in the second linear vector by the checksum including computing a checksum for blocks of data words each of which comprises a predetermined number of data words until a checksum is produced which includes all the data words in the second linear vector.

9. The improvement of claim 8 further including forming a header attached to the formatted array, one portion of the header including data words representing the checksum value for the data words contained in the second linear vector, the checksum value being used to authenticate the contents of the formatted image.

10. The improvement of claim 3 wherein the information included in the additional data words includes time and place information about the event, and identification of a device used to capture said video image.

11. A method of authenticating a video image comprising:
creating a video image using a video device;
formatting the video image into a 2-dimensional pixel array in which each pixel is represented by a data word of a predetermined length;
adding to the 2-dimensional array additional data words of the same predetermined length, which data words include event related information;
converting the formatted array, including the additional data words into a second 2-dimensional array by manipulating the rows and columns forming the formatted array;
determining a checksum from the data words forming the second array;
forming a header using the checksum, information identifying the device used to create the image, and the time at which the image is formed; and,
attaching the header to the formatted array and storing or transmitting the header with the formatted array to authenticate the content of the original image as stored in the formatted array.

12. The method of claim 11 further including performing a cyclical redundancy check on all the data words, including the additional data words, in the first 2-dimensional array.

13. The method of claim 12 further forming a result of the cyclical redundancy check into said header.

14. The method of claim 11 wherein the additional data words added to the first said 2-dimensional array include data words identifying the video device creating the image, the location where the image is created, and the time when the image was created.

15. In a method of authenticating a video image by forming the image into a data format, encrypting a portion of the formatted image, and attaching the encrypted portion to the original image so the content of the original image can thereafter be authenticated by reference to the encrypted portion thereof, said formatted image comprising a 2-dimensional array of pixels each of which is represented by a data word of a defined length and the method includes converting the formatted image from said 2-dimensional array into a second 2-dimensional array, the improvement comprising:
adding to the first said 2-dimensional array additional data words of the same predetermined length, which data words include information identifying the video device creating the image, the location where the image is created, and the time when the image was created; and,
performing a cyclical redundancy check on the first said 2-dimensional array including the data words for every pixel forming the content of said original image, and the additional data words.

16. The method of claim 15 wherein said additional data words are formed into rows and columns and forming said second 2-dimensional array includes manipulating rows and columns of the formatted array by a defined set of rules, the rows and columns being manipulated including those having said additional data words.

17. The improvement of claim 16 further including converting the second 2-dimensional array into a first linear vector by concatenating the data words contained in the second array, and converting said first linear vector into a second linear vector in which the position of the data words in the first linear vector are relocated to different positions in the second linear vector, the position of the data words into the second linear array being randomly selected.

18. The improvement of claim 17 further including determining a checksum using the data words as arranged in the second linear vector, determining the checksum including computing a checksum for blocks of data words each of which comprises a predetermined number of data words until a checksum is produced which includes all the data words in the second linear vector.

19. The improvement of claim 18 further including forming a header attached to the formatted array, one portion of the header including data words representing the checksum value for the data words contained in the second linear vector, the checksum value being used to authenticate the contents of the formatted image, and a second portion of the header including results of the cyclical redundancy check.

* * * * *